(12) United States Patent
Yokochi et al.

(10) Patent No.: US 10,784,730 B2
(45) Date of Patent: Sep. 22, 2020

(54) ROTOR OF SYNCHRONOUS MOTOR

(71) Applicant: OKUMA Corporation, Niwa-gun, Aichi (JP)

(72) Inventors: Takanori Yokochi, Aichi (JP); Tatsuya Shizu, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 214 days.

(21) Appl. No.: 16/167,979

(22) Filed: Oct. 23, 2018

(65) Prior Publication Data

US 2019/0131834 A1    May 2, 2019

(30) Foreign Application Priority Data

Oct. 30, 2017 (JP) ................................. 2017-208740

(51) Int. Cl.
*H02K 1/27* (2006.01)
*H02K 1/16* (2006.01)
*H02K 21/02* (2006.01)

(52) U.S. Cl.
CPC ............. *H02K 1/276* (2013.01); *H02K 1/16* (2013.01); *H02K 21/02* (2013.01)

(58) Field of Classification Search
CPC ............................................. H02K 1/27–2793
See application file for complete search history.

(56) References Cited

U.S. PATENT DOCUMENTS

| | | | | |
|---|---|---|---|---|
| 5,223,759 A | * | 6/1993 | Shimoda | F04C 29/0085 29/598 |
| 5,508,576 A | * | 4/1996 | Nagate | C08L 23/02 310/156.54 |
| 5,731,647 A | * | 3/1998 | Schuller | H02K 1/2746 310/114 |
| 2008/0224558 A1 | * | 9/2008 | Ionel | H02K 1/2766 310/156.57 |
| 2015/0280502 A1 | * | 10/2015 | Hirotani | H02K 1/276 310/68 R |
| 2020/0021177 A1 | * | 1/2020 | Shizu | H02K 1/02 |
| 2020/0220402 A1 | * | 7/2020 | Watanabe | H02K 7/14 |

FOREIGN PATENT DOCUMENTS

JP           2007143331 A      6/2007

* cited by examiner

*Primary Examiner* — Ramon M Barrera
(74) *Attorney, Agent, or Firm* — Cantor Colburn LLP

(57) ABSTRACT

A rotor of a synchronous motor has a rotor core and a permanent magnet. The rotor core has a plurality of magnet insertion apertures and a plurality of slits. The permanent magnet is disposed in each of the magnet insertion apertures such that the magnetic poles of the permanent magnets are directed in a diameter direction. The slits are formed on an radially outer side of the magnet insertion aperture so as to align with intervals along a side of the permanent magnet. Magnetic paths are defined between adjacent slits. A gap that is a slot open in the axial direction of the rotor core is formed on the opposite side from a plurality of magnetic paths across the permanent magnet to adjust the magnetic resistance of the magnetic paths for making a change in magnetic flux between adjacent magnetic paths small.

4 Claims, 3 Drawing Sheets

ROTOR OF SYNCHRONOUS MOTOR

CROSS REFERENCE TO RELATED APPLICATION

The present application claims priority under 35 U.S.C. § 119 to Japanese Patent Application No. 2017-208740 filed on Oct. 30, 2017, the disclosure of which is incorporated herein by reference.

TECHNICAL FIELD

The present invention relates to the rotors of IPM synchronous motors, the rotors each including a permanent magnet.

BACKGROUND

The rotors of motors have various structures. For example, some rotors have a plurality of magnet insertion apertures formed inside thereof and permanent magnets residing in the respective magnet insertion apertures. These type of motors are referred to as Inner Permanent Magnet (IPM) synchronous motors. The rotors of such IPM synchronous motors will now be described.

FIG. 2 is a cross sectional view of one exemplary rotor of a conventional IPM synchronous motor. As illustrated in FIG. 2, the rotor 1 includes a plurality of silicon steel sheets stacked in layers. The rotor 1 includes a rotor core 8 and permanent magnets 3. The rotator core 8 has a plurality of magnet insertion apertures MS and a plurality of slits 7. Each permanent magnet 3 is disposed in each magnet insertion aperture MS. Specifically, the permanent magnet 3 is oriented such that its magnetic poles are directed in the diameter direction of the rotor 1. That is, the poles (magnetic poles) of the permanent magnet 3 are directed inward and outward, respectively, in the diameter direction of the rotor 1.

As illustrated in FIG. 2, the slits 7 are formed parallel with the magnetic flux generated from the permanent magnet 3. The slits 7 and the magnetic flux from the permanent magnet 3 constitute an N-pole or S-pole magnetic pole of the rotor 1. The slits 7 are formed on the radially outer side of the magnetic insertion aperture MS so as to align along a side of the permanent magnet 3 with intervals. A magnetic path is defined between adjacent slits 7.

The motor has a stator disposed outside the rotor 1. FIG. 3 illustrates a part of the rotor 1 and a part of the stator 2 enlarged. In FIG. 3, the stator 2 has slots 5 where wires reside and teeth 6 through which magnetic flux passes. An air layer, or an air gap AG, is defined between the stator 2 and the rotor 1. As publicly known, a current applied to the wire in the slot 5 generates a torque in the rotor 1 in accordance with the position of the magnetic pole of the rotor 1, according to Fleming's left-hand rule. The applied current in the wire also generates concentric magnetic fluxes with the wire as the center, according to Fleming's right-hand rule. The generated magnetic flux extends orthogonal to the direction of the magnetic flux of the permanent magnet 3, thus hindering torque generation with the rotor 1. To address the above, the slit 7 is formed in the rotor 1 so as to extend parallel with the magnetic flux from the permanent magnet 3, that is, orthogonal to the direction of the magnetic flux due to the current that generates torque.

When no current is applied to the wire in the slot 5 and the rotor 1 is then forced to rotate at a constant speed with an external force applied to the shaft of the motor, for example, a torque generated on the rotor 1 will pulsate. This phenomenon is referred to as cogging torque ripple. Cogging torque ripple is known to be caused due to a change in magnetic attraction force generated between the rotor 1 and the stator 2. The magnitude of the magnetic attraction force is determined so as to be proportional to the number of lines of magnetic flux extending from the rotor 1 across the air gap AG to the stator 2. That is, a larger magnetic attraction force is generated in an area with a greater number of lines of magnetic flux, while only a smaller magnetic attraction force is generated in an area with a smaller number of lines of magnetic flux.

Cogging torque ripple is caused due to variation in magnetic attraction force, the variation depending on the position of the rotor 1, as described above. Note here that the number of lines of magnetic flux from the permanent magnet 3 is always constant. Meanwhile, the fact that a magnetic attraction force varies indicates that the number of lines of magnetic flux extending from the rotor 1 across the air gap AG to the stator 2 varies, as described above. That is, the number of lines of magnetic flux extending to the stator 2 varies despite the constant number of lines of magnetic flux generated by the permanent magnet 3 because the magnetic resistance between the rotor 1 and the stator 2 varies. The magnitude of magnetic resistance is determined based on a variety of factors, including the distance of the air gap AG and the length or thickness of a magnetic path. Hence, variation in magnetic resistance between the rotor 1 and the stator 2 depending on the position of the rotor 1 is inevitable when the stator 2 has a discrete structure including teeth and open portions alternately formed.

CITATION LIST

Patent Literature

Patent Literature 1 JP 2007-143331A

SUMMARY

Technical Problem

When no current is applied to the wire of the stator 2 with the rotor 1 having the structure as illustrated in FIG. 3, the magnetic flux from the permanent magnet 3 passes as indicated by the arrows in FIG. 3. That is, in the case where the N-pole of the permanent magnet 3 is directed outward in the diameter direction, as illustrated in FIG. 3, magnetic flux passes straight toward the stator 2 while avoiding the slit 7 in the vicinity of the middle of the permanent magnet 3. In the vicinity of the respective ends of the permanent magnet 3, on the other hand, the magnetic flux partially goes around the magnetic insertion aperture MS with the permanent magnet 3 therein to proceed toward the S-pole of the permanent magnet 3, as indicated by or in the drawing, besides the magnetic flux passing straight toward the stator 2.

Assume that, as illustrated in FIG. 3, there are four slits 7 S1 to S4, and that magnetic paths between the respective adjacent slits S1, S2, S3, S4 and magnetic paths outside the respective end slits S1, S4 are referred to as magnetic paths Z1 to Z5, respectively. In this case, some of the magnetic flux from near the middle of the permanent magnet 3 directly enters the middle magnetic path Z3 and passes through, with some avoiding the slits S2, S3. Further, some of the magnetic flux from the permanent magnet directly enters the magnetic path Z2 immediately next to the middle magnetic path Z3 and passes through, with some avoiding the slits S1, S2. This is similarly applied to the magnetic path Z4. Still further, some of the magnetic flux from the permanent magnet 3 directly enters the endmost magnetic path Z1 and passes through, with some avoiding the slit S1. Near the magnetic path Z1, moreover, some of the magnetic flux goes around the magnetic insertion aperture MS with the permanent magnet 3 therein to proceed toward the S-pole, as described above. This is similarly applied to the magnetic path Z5.

As described above, the magnetic flux from the permanent magnet 3 passes through the rotor 1 and traverses the air gap AG to proceed to the stator 2. In the above, the magnetic flux densities are different from one another in the magnetic paths Z1 to Z5. That is, whereas the magnetic flux from the permanent magnet 3 directly or while avoiding the slit 7 passes through the magnetic paths Z2, Z3, and Z4, the magnetic flux partially goes around the magnetic insertion aperture MS, as described above. This results in a lower magnetic flux density in the magnetic paths Z1, Z5, compared with those in the magnetic paths Z2, Z3, Z4. Moreover, of the magnetic paths Z2, Z3, Z4, the magnetic flux density in the magnetic path Z3 is slightly lower compared with those in the magnetic paths Z2, Z4. This is because the permanent magnet 3 is magnetized so as to have a lower magnetic flux density in its middle portion, compared with those in its end portions. Consequently, the highest magnetic flux density results in the magnetic paths Z2, Z4, or magnetic paths immediately next to the middle magnetic path Z3, the second highest magnetic flux density in the middle magnetic path Z3, and the lowest magnetic flux density in the magnetic paths Z1, Z5.

The fact that the magnetic flux density differs among the magnetic paths indicates that the number of lines of magnetic flux traversing the air gap AG to enter the stator 2 along the outer surface of the rotor 1 is different depending on positions. This difference leads to variation in magnetic attraction force, as described above, thus causing cogging torque ripple. Specifically, a large change in magnetic flux (that is, a large difference in magnetic flux density) between adjacent magnetic paths Z1, Z2 (similarly applied to the magnetic paths Z4 and Z5), as described above, can more likely cause large cogging torque ripple.

In view of the above, the present invention aims to provide a rotor of an IPM synchronous motor that causes less cogging torque ripple.

Solution to Problem

The rotor of a synchronous motor according to the present invention has a structure described below to achieve the above-described object.

According to one aspect of the present invention, there is provided a rotor of a synchronous motor including a rotor core including silicon steel sheets stacked in layers and having a plurality of magnet insertion apertures and a plurality of slits, and a permanent magnet residing in each of the magnet insertion apertures such that magnetic poles of the permanent magnet are directed in a diameter direction, wherein the slits are formed on an radially outer side of the magnet insertion apertures so as to align with intervals along a side of the permanent magnet, the rotor further including one or more magnetic paths defined between adjacent slits, and the rotor further including a gap formed on an opposite side from one or more predetermined magnetic paths across the permanent magnet to adjust magnetic resistance of the predetermined magnetic paths for making a change in magnetic flux between adjacent magnetic paths small, the gap being a slot open in an axial direction of the rotor core.

In one embodiment of the present invention, the gap may be formed on the opposite side from the one or more predetermined magnetic paths across the permanent magnet for making equivalent magnetic fluxes pass through the respective magnetic paths.

In one embodiment of the present invention, the gap may be formed on the opposite side from the one or more predetermined magnetic paths across the permanent magnet for having magnetic fluxes in the plurality of magnetic paths exhibit a sinusoidal distribution with magnetic flux in a magnetic path near a middle of the permanent magnet at a maximum.

In one embodiment of the present invention, the gap may be formed by enlarging the magnet insertion aperture and may constitute a part of the magnet insertion aperture.

Advantageous Effects of Invention

According to the present invention, a gap is formed on the opposite side from one or more predetermined magnetic paths across the permanent magnet to adjust the magnetic resistance of the predetermined magnetic path/paths for making a change in magnetic flux between adjacent magnetic paths small. This can reduce cogging torque ripple.

BRIEF DESCRIPTION OF DRAWINGS

Embodiment(s) of the present disclosure will be described based on the following figures, wherein.

DESCRIPTION OF EMBODIMENTS

Figure 1:
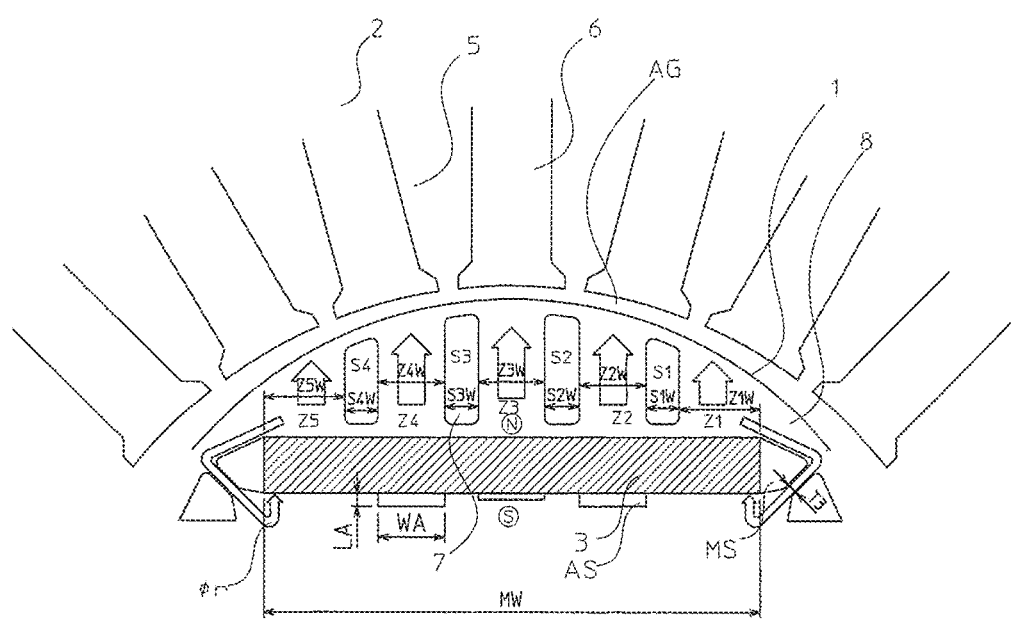
FIG. 1 illustrates an example of a part of a rotor and a part of a stator according to an embodiment of the present invention.
Figure 2:
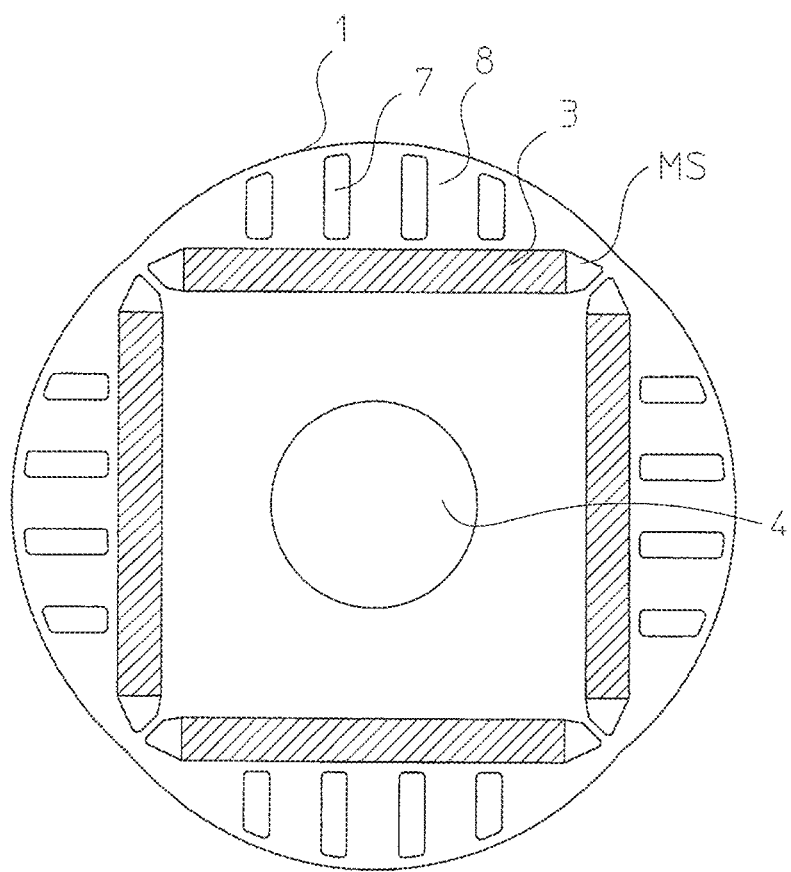
FIG. 2 illustrates an example of a conventional rotor.
Figure 3:
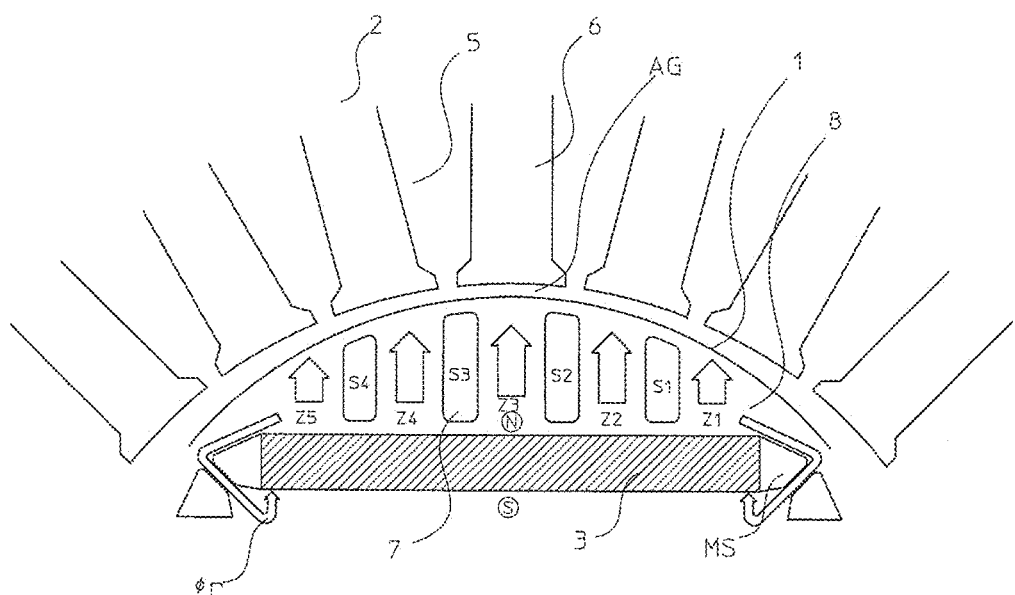
FIG. 3 illustrates an example of a part of a conventional rotor and a part of a conventional stator.

FIG. 1 illustrates an example of a part of the rotor 1 and a part of the stator 2 in an embodiment of the present invention. Of the components constituting the rotor 1 in FIG. 1, any component similar to an element illustrated in FIG. 2 and FIG. 3 referred to in connection with the conventional technique is given the same reference numeral and will not be described in detail again.

In FIG. 1, a gap AS is formed on the radially inner side of a magnetic insertion aperture MS with a permanent magnet 3 therein. The gap AS has a predetermined width WA and a predetermined length LA. The gap AS is formed on the opposite side from a predetermined magnetic path relative to the permanent magnet 3. The gap is actually a stepped cut-out defined on one side of the magnet insertion aperture MS where a permanent magnet 3 is inserted. Insertion of a permanent magnet 3 leaves the gap AS between the permanent magnet 3 and the rotor core 8. In other words, the gap AS is a slot formed on the opposite side from a predetermined magnetic path across the permanent magnet 3, the slot extending in the axial direction of the rotor core 1. The gap AS is formed by enlarging the magnetic insertion aperture MS radially inward. Hence, the gap AS can be considered as a part of the magnet insertion aperture MS. The gap AS has a width WA equal to the width of a magnetic path in FIG. 1 and a length LA shorter than the width WA. Although the gap AS is a stepped cut-out formed on side of the magnetic insertion aperture MS on the radially inner side in this embodiment, as described above, the gap AS can be formed at a position displaced slightly inward radially from the magnetic insertion aperture MS as a slot separate from the magnetic insertion aperture MS.

A typical permanent magnet 3 has an N-pole and an S-pole, and magnetic flux from the N-pole normally extends to the S-pole. If the magnetic resistance is large around either of the poles, the number of lines of magnetic flux will decrease. For example, formation of an air layer around the N-pole to thereby increase magnetic resistance only around the N-pole leads to reduction in the number of lines of magnetic flux from the N-pole. Where a magnetomotive force is denoted as $\Phi m$, a magnetic resistance as $Rm$, and a magnetic flux as $Nm$, the relation expressed by Expression 1 below holds.

$$\Phi m = Rm \times Nm \qquad \text{[Expression 1]}$$

As is known from Expression 1 above, for a permanent magnet 3 having a constant magnetomotive force, an increase in magnetic resistance leads to a decrease in the number of lines of magnetic flux. This is similarly applied to the case of larger magnetic resistance around the S-pole.

In a structure having a gap AS formed on a radially inner side of the permanent magnet 3, as illustrated in FIG. 1, a smaller number of lines of magnetic flux are generated from the pole on the opposite side from the side with the gap AS, compared with a structure without the gap AS. Here, the permanent magnet 3 can be considered as a collection of aligned magnetic bars, assuming the constant width of the permanent magnet 3 is divided. The decrease in the number of lines of magnetic flux, mentioned above, can be explained as, since formation of a gap on a radially inner side of one of the poles of the bar magnets increases the magnetic resistance, the increased magnetic resistance reduces the number of lines of magnetic flux generated from the opposite poles. That is, the number of lines of magnetic flux on the side opposite from the side with the gap AS decreases. In this embodiment, for the magnetic paths Z1 to Z5 in FIG. 1, gaps AS are formed on the opposite side from a plurality of predetermined magnetic paths across the permanent magnet 3 to adjust the magnetic resistance of, and thus the magnetic fluxes in, the magnetic paths for making a change in magnetic flux, or a difference in magnetic flux density, smaller between adjacent magnetic paths.

Where the length of the magnetic circuit is denoted as $Lm$, a cross section as $Sm$, and a permeability of a part concerned as the magnetic resistance $Rm$ can be expressed by Expression 2 below.

$$Rm = Lm/(\mu \times Sm) \qquad \text{[Expression 2]}$$

The magnetic resistances $Rm1$ to $Rm5$ of the respective magnetic paths Z1 to Z5 can be calculated by Expression 2 above. The magnetic resistance of a magnetic path with a gap AS contains magnetic resistance $RmAS$ of the area of the gap AS. The magnetic resistance $RmAS$ of the area of the gap AS can be calculated by Expression 2 above, using the length LA of the gap AS as the length $Lm$ of a magnetic circuit, and a product of the width WA of the gap AS and the stacking length of the rotor core 8 as the cross section $Sm$. A longer length LA of the gap AS leads to larger magnetic resistance $RmAS$ of the area of the gap AS, and thus larger magnetic resistance of a magnetic path corresponding to the gap AS.

Once the magnetic resistance of a magnetic path is known, how much increase in magnetic resistance $Rm$ leads to how much decrease in magnetic flux $Nm$ can be obtained by Expression 1 above as the magnetomotive force $\Phi m$ of the permanent magnet 3 is already known. In other words, what length LA and what width WA of the gap AS leads to how much decrease in magnetic flux $Nm$ can be known.

As illustrated in FIG. 1, assume that the slits S1, S2, S3, S4 have respective widths S1W, S2W, S3W, S4W, and that a connection portion outside the magnetic insertion apertures SM has a width T3. Further assume that the magnetic paths Z1, Z2, Z3, Z4, Z5 have respective widths Z1W, Z2W, Z3W, Z4W, Z5W. In this case, the magnetomotive force $\Phi m1$ in the magnetic path Z1 can be expressed by Expression 3 below, where the magnetomotive force of the whole permanent magnet is denoted as $\Phi m$, and the width of the permanent magnet 3 as MW.

$$\Phi m1 = \Phi m \times (Z1W + S1W/2 - T3)/MW \qquad \text{[Expression 3]}$$

Expression 3 indicates that the permanent magnet surface has uniform magnetomotive force, that the magnetic path width Z1W of the magnetic path Z1 and a half of the width S1W of the slit S2 contribute to magnetomotive force, and that an amount of magnetic flux corresponding to the width T3 escapes whereby the magnetomotive force accordingly decreases.

Similarly, the magnetomotive force $\Phi m2$ in the magnetic path Z2 and the magnetomotive force $\Phi m3$ in the magnetic path Z3 can be obtained by Expressions 4 and 5 below, respectively.

$$\Phi m2 = \Phi m \times (Z2W + S1W/2 + S2W/2)/MW \qquad \text{[Expression 4]}$$

$$\Phi m3 = \Phi m \times (Z3W + S2W/2 + S3W/2)/MW \qquad \text{[Expression 5]}$$

Using the magnetic resistance $Rm1$, $Rm2$, $Rm3$ of the respective magnetic paths Z1, Z2, Z3 and the magnetomotive forces $\Phi m1$, $\Phi m2$, $\Phi m3$, mentioned above, the magnetic fluxes $Nm1$, $Nm2$, $Nm3$ can be obtained by Expression 1 as respective Expressions 6, 7, and 8 below.

$$Nm1\Phi m1/Rm1 = \Phi m \times (Z1W + S1W/2 - T3)/(MW \times Rm1) \qquad \text{[Expression 6]}$$

$$Nm2 = \Phi m2/Rm2 = \Phi m \times (Z2W + S1W/2 + S2W/2)/(MW \times Rm2) \qquad \text{[Expression 7]}$$

$$Nm3 = \Phi m3/Rm3 = \Phi m \times (Z3W + S2W/2 + S3W/2)/(MW \times Rm3) \qquad \text{[Expression 8]}$$

Note here that the magnetic path Z2 has a corresponding gap AS, and its magnetic resistance $Rm2$ contains the magnetic resistance $Rm2AS$ of the area of the gap AS and thus is increased accordingly. Dividing the magnetic resistance $Rm2$ of the magnetic path Z2 into the magnetic resistance $Rm2AS$ in the area of the gap AS and the magnetic resistance $Rm2i$ in other areas allows rewriting of Expression 7 into Expression 9.

$$Nm2 = \Phi m2/Rm2 = \Phi m \times (Z2W + S1W/2 + S2W/2)/(MW \times (Rm2i + Rm2AS)) \qquad \text{[Expression 9]}$$

As illustrated in FIG. 1, the magnetic path Z3 has a corresponding gap AS. Thus, the magnetic resistance $Rm3$ of the magnetic path Z3 contains the magnetic resistance $Rm3AS$ of the area of the gap AS and thus is increased accordingly. Dividing the magnetic resistance $Rm3$ of the magnetic path Z3 into the magnetic resistance $Rm3AS$ in the area of the gap AS and the magnetic resistance $Rm3i$ in other areas allows rewriting of Expression 8 into Expression 10.

$$Nm3\Phi m3/Rm3 = \Phi m \times (Z3W + S2W/2 + SW/2)/MW \times (Rm3 + Rm3AS)) \qquad \text{[Expression 10]}$$

The magnetic path Z4 has a corresponding gap AS, and the magnetomotive force $\Phi m4$ and the magnetic flux $Nm4$ of the magnetic path Z4 can be obtained in a manner similar to that for the magnetomotive force $\Phi m2$ and magnetic flux Nm2 of the magnetic path Z2 mentioned above. Further, the magnetomotive force Φm5 and magnetic flux Nm5 of the magnetic path Z5 can be obtained in a manner similar to that for the magnetomotive force Φm1 and magnetic flux Nm1 of the magnetic path Z1 mentioned above.

In order to reduce cogging torque ripple, it is necessary to make a change in magnetic flux between adjacent magnetic paths small. In view of the above, a gap AS is formed to adjust the magnetic resistance of a magnetic path for making a change in magnetic flux between adjacent magnetic paths small, more specifically, to have equivalent magnetic fluxes, or magnetic fluxes having the same magnetic flux density, passing through the respective magnetic paths. In other words, a gap AS is formed to adjust the magnetic resistance of a magnetic path so that equivalent magnetic fluxes are generated due to magnetomotive forces of the respective magnetic paths, or (Nm1=Nm2=Nm3=Nm4=Nm5) is held. For this purpose, the lengths LA and the widths WA of the respective gaps AS corresponding to the respective magnetic paths are obtained by Expressions 6, 9, and 10 above so as to hold Nm1=Nm2=Nm3 (=Nm4=Nm5).

In the example in FIG. 1, gaps AS are formed on the opposite side from the respective magnetic paths Z2, Z3, Z4 across the permanent magnet 3 to adjust the respective magnetic resistances Rm2, Rm3, Rm4 so that the respective magnetic fluxes Nm2, Nm3, Nm4 in the magnetic paths Z2, Z3, Z4 become equal to the magnetic fluxes Nm1, Nm5 of the magnetic paths Z1, Z5 as a reference magnetic flux. In the example in FIG. 1, the lengths LA of the gaps AS for the magnetic paths Z2, Z4, with the largest magnetic flux, that is, the highest magnetic flux density, without a gap, is set longer than the length LA of the gap AS for the magnetic path Z3, to thereby increase the magnetic resistance for decreasing the magnetic flux densities of the magnetic fluxes Nm2, Nm4.

As described above, the rotor 1 of a synchronous motor in this embodiment include gaps AS formed on the opposite side from a plurality of predetermined magnetic paths across the permanent magnet 3 to adjust the magnetic resistance of the magnetic paths to make equivalent magnetic fluxes pass through the respective magnetic paths. This adjustment can make a change in magnetic flux between adjacent magnetic paths small, and thus can effectively reduce cogging torque ripple Although gaps AS are formed on the opposite side from a plurality of predetermined magnetic paths across the permanent magnet 3 in the above embodiment, a gap AS may be formed on the opposite side from a single predetermined magnetic path across the permanent magnet 3, for example, depending on the number of the slits 7.

Although a gap AS is formed on the opposite side from a magnetic path across the permanent magnet 3 in the above embodiment, a gap AS may be formed on the magnetic path side (on the radially outer side of the permanent magnet 3). This structure, however, results in a narrower width of the silicon steel sheets disposed between (bridging) the gap AS and the slit 7, which increases the possibility of cracking of the sheets, for example, due to centrifugal force acting on the rotor 1 in rotation. In view of the above, formation of a gap AS on the opposite side from a magnetic path across the permanent magnet 3, as is in the above-described embodiment, is more preferred.

Although the lengths LA and widths WA of the gaps AS are determined such that the magnetic flux is equal in all magnetic paths in the above embodiment, this is not limiting, and any other embodiment that can make a change in magnetic flux between adjacent magnetic paths small is applicable. For example, the magnetic flux Nm3 near the center of a magnetic pole may be set large, and the magnetic fluxes Nm1, Nm5, far from the center of the magnetic pole, may be set small, based on Expressions 6, 9, 10, so that the magnetic fluxes in the magnetic paths exhibit a sinusoidal distribution with flux at the center of the magnetic pole at the maximum. In other words, a gap AS may be formed on the other side from one or more predetermined magnetic paths across the permanent magnet 3 to adjust the magnetic resistance of the magnetic path/paths such that the magnetic flux distribution relevant to the magnetic paths exhibits a sinusoidal distribution with the magnetic flux in the magnetic path near the middle of the permanent magnet 3 at the maximum. This structure also achieves continuous change in magnetic flux over a plurality of magnetic paths, and thus can make a change in magnetic flux between adjacent magnetic paths small. Consequently, cogging toque ripple can be reduced.

The above-described disposition of a gap AS is merely one example. The gap AS may have any width WA equal to or smaller than the width of a magnetic path which the gap AS faces, without limitation. Any number of gaps AS may be formed, without limitation.

REFERENCE SIGNS LIST 1 rotor, 2 stator, 3 permanent magnet, 4 rotation shaft, 5 slot, 6 teeth, 7, S1 to S4 slit, 8 rotor core, MS magnetic insertion aperture, AS gap, Z1 to Z5 magnetic path.

The invention claimed is:

1. A rotor of a synchronous motor, comprising:
a rotor core including silicon steel sheets stacked in layers and having a plurality of magnet insertion apertures and a plurality of slits, and
a permanent magnet residing in each of the magnet insertion apertures such that magnetic poles of the permanent magnet are directed in a diameter direction, wherein
the slits are formed on an radially outer side of the magnet insertion apertures so as to align with intervals along a side of the permanent magnet,
the rotor further comprises one or more magnetic paths defined between adjacent slits, and
the rotor further comprises a gap formed on an opposite side from one or more predetermined magnetic paths across the permanent magnet to adjust magnetic resistance of the predetermined magnetic paths for making a change in magnetic flux between adjacent magnetic paths small, the gap being a slot open in an axial direction of the rotor core.

2. The rotor of a synchronous motor according to claim 1, wherein the gap is formed on the opposite side from the one or more predetermined magnetic paths across the permanent magnet for making equivalent magnetic fluxes pass through the respective magnetic paths.

3. The rotor of a synchronous motor according to claim 1, wherein the gap is formed on the opposite side from the one or more predetermined magnetic paths across the permanent magnet for having magnetic fluxes in the plurality of magnetic paths exhibit a sinusoidal distribution with magnetic flux in a magnetic path near a middle of the permanent magnet at a maximum.

4. The rotor of a synchronous motor according to claim 1, wherein the gap is formed by enlarging the magnet insertion aperture and constitutes a part of the magnet insertion aperture.

* * * * *